United States Patent [19]

Kanda

[11] Patent Number: 4,854,561
[45] Date of Patent: Aug. 8, 1989

[54] ELASTIC BUSHING FILLED WITH VISCOUS FLUID

[75] Inventor: Ryouji Kanda, Komaki, Japan

[73] Assignees: Tokai Rubber Industries, Ltd., Aichi; Nissan Motor Company, Limited, Kanagawa, both of Japan

[21] Appl. No.: 230,776

[22] Filed: Aug. 10, 1988

[51] Int. Cl.$^4$ ............................................. F16F 15/04
[52] U.S. Cl. .............................. 267/140.1; 267/140.5; 267/292; 248/562; 248/636
[58] Field of Search ............. 267/219, 258, 292, 140.5, 267/137, 35, 281, 140.1, 121, 141; 248/562, 636, 659, 638

[56]           References Cited
U.S. PATENT DOCUMENTS

| 4,139,246 | 2/1979 | Mikoshiba et al. | 267/281 |
| 4,416,445 | 11/1983 | Coad | 267/219 |
| 4,744,677 | 5/1988 | Tanaka et al. | 267/292 |
| 4,770,396 | 9/1988 | Jouade | 267/219 |

FOREIGN PATENT DOCUMENTS 2600736 12/1987 France ............................ 267/140.1

Primary Examiner—Andres Kashnikow
Assistant Examiner—Mark T. Le
Attorney, Agent, or Firm—Browdy and Neimark

[57] ABSTRACT

A fluid filled elastic bushing, including a tubular inner sleeve to which a shaft member is fixed, and a tubular outer sleeve which is secured to a support structure and which is disposed radially outwardly of the inner sleeve so as to form an annular space between the outer and inner circumferential surfaces of the inner and outer sleeves, and to form a cylindrical space between opposed bottom walls at the closed ends of the two sleeves. The bushing further includes a cylindrical elastic connecting member which fluid tightly fills a portion of the annular space adjacent to the open ends of the two sleeves, and thereby cooperates with the sleeves to define a fluid chamber which includes a remaining portion of the annular space and the cylindrical space and which is filled with the fluid. A first elastic operating member is formed on one of the outer and inner circumferential surfaces of the two sleeves, so as to occupy a part of the remaining portion of the annular space and cooperate with the other circumferential surface to define an annular restricted portion of the fluid chamber. A second elastic operating member is formed on one of the bottom walls of the sleeves, so as to occupy a part of the cylindrical space and cooperate with the other bottom wall to define a planar restricted portion of the fluid chamber.

6 Claims, 3 Drawing Sheets

ELASTIC BUSHING FILLED WITH VISCOUS FLUID

BACKGROUND OF THE INVENTION

1. Field of the Invention

The present invention relates generally to an elastic bushing filled with a viscous fluid, and more particularly to such a fluid-filled elastic bushing which exhibits an excellent characteristic of damping input vibrations.

2. Discussion of the Prior Art

As one type of vibration insulator for flexible or elastic connection of a shaft member of a vibration system to a support structure, there is known a vibration-isolating bushing such as an elastic bushing which includes a tubular elastic body which is closed at its one end and open at the other end. For example, the tubular elastic body is secured to a suitable support member such as a frame of a front-engine front-drive vehicle having a strut type front suspension system, such that a shaft member such as a compression rod which serves as a pivot on the rear side of a L-type lower arm of the suspension system is fixedly inserted into the bore of the elastic body. According to this arrangement, the shaft member is connected to the support member in a vibration isolating or damping manner, so that the tubular elastic body restrains displacements of the shaft member in one of its opposite axial directions and in its radial direction.

The elastic bushing having the conventional construction employing a single formed rubber mass as the elastic body as described above is uncapable of providing a sufficient damping effect with respect to vibrations applied thereto. In particular, it has been difficult to provide the conventional elastic bushing with excellent damping characteristic to input vibrations which has a comparatively low frequency range.

Where the elastic bushing is used as a vibration-isolating bushing for flexibly connecting the compression rod of the L-type lower arm of the vehicle front suspension system to the vehicle frame,, the elastic body suffers from low vibration damping characteristic with respect to vibrations which are applied in the radial direction of the bushing, particularly where the frequency of the vibrations falls within a range of approximately 10–15 Hz, which is the resonance frequency of the suspension system. Hence, the elastic bushing is uncapable of effectively preventing shimmy vibrations of the vehicle in running, which have an adverse effect on the steering and running stabilities of the vehicle. Thus, the known elastic bushing has a problem that should be solved.

SUMMARY OF THE INVENTION

It is accordingly an object of the present invention to provide an elastic bushing filled with a viscous fluid, which is capable of providing improved vibration damping and isolating characteristic with respect to vibrations applied in both axial and radial directions thereof.

The above object may be achieved according to the principle of the present invention, which provides an elastic bushing filled with a viscous fluid, for flexible connection of a shaft member to a support structure, comprising: (a) a tubular inner sleeve which is closed at one of opposite axial ends thereof and open at the other end, the shaft member being fixedly inserted in the inner sleeve; (b) a tubular outer sleeve which is closed at one of opposite axial ends thereof and open at the other end, and which is disposed radially outwardly of the inner sleeve such that an annular space is formed between an outer circumferential surface of the inner sleeve and an inner circumferential surface of the outer sleeve and such that a cylindrical space is formed between opposed surfaces of bottom walls at the closed ends of the inner and outer sleeves, the outer sleeve being secured to the support structure; (c) a cylindrical elastic connecting member which fluid tightly fills a portion of the annular space adjacent to the open ends of the inner and outer sleeves, and thereby cooperate with the inner and outer sleeves to define a fluid chamber which includes a remaining portion of the annular space and the cylindrical space, the fluid chamber being filled with the fluid; and (d) a first elastic operating member formed on one of the outer and inner circumferential surfaces of the inner and outer sleeves, so as to occupy a part of the remaining portion of the annular space and cooperate with the other of the outer and inner circumferential surfaces to define therebetween an annular first restricted portion of the fluid chamber. Preferably, the instant elastic bushing further comprises a second elastic operating member formed on one of the opposed surfaces of the bottom walls of the inner and outer sleeves, so as to occupy a part of the cylindrical space and cooperate with the other of the opposed surfaces to define therebetween a planar second restricted portion of the fluid chamber which extends in a radial direction of the bushing.

In the fluid-filled elastic bushing of the present invention constructed as described above, the masses of the viscous fluid existing in the first and second restricted portions of the fluid chamber are subject to shearing stresses when the first and second elastic operating members are oscillated in the radial and axial directions of the bushing, upon radial and axial relative displacements of the inner and outer sleeves due to vibrations applied to the bushing in the radial and axial directions. However, the viscosity of the fluid masses provides a resistance to those shearing stresses, which results in effectively damping the input radial and axial vibrations. This damping effect obtained based on the viscosity of the fluid in the restricted portions of the fluid chamber is added to a damping effect which is offered by the elastic connecting member disposed between the inner and outer sleeves. Hence, the instant fluid-filled elastic bushing exhibits improved vibration damping and insulating characteristic, in particular, better damping effect, than the conventional elastic bushing which merely employs a formed elastic body between the inner and outer sleeves.

In one form of the present invention, the elastic bushing further comprises a metal sleeve fitted on an outer circumferential surface of the cylindrical elastic connecting member, and a rubber layer formed on a portion of the inner circumferential surface of the outer sleeve adjacent to the open end thereof. In this case, the metal sleeve is held in pressed abutting contact with the rubber layer, so as to maintain fluid tightness of the fluid chamber. The rubber layer may have a plurality of sealing lips which are spaced part from each other in an axial direction of the bushing.

In another form of the invention, the cylindrical elastic connecting member and the first and second elastic operating members constitute an integrally formed elastic body which is secured by vulcanization of an unvulcanized rubber material to the inner sleeve, in a suitably prepared mold.

In a further form of the invention, the bottom wall of the outer sleeve has a plurality of fluid injecting holes through which the fluid is introduced into the fluid chamber. In this case the fluid chamber may be filled after the elastic bushing is assembled with the fluid chamber left unfilled. However, the fluid chamber may be filled with the fluid, during assembling of the bushing within a mass of the fluid.

In a still further form of the invention, the outer sleeve has a stepped cylindrical wall which has the inner circumferential surface that partially define the annular space. The stepped cylindrical wall includes a large-diameter portion adjacent to the open end of the outer sleeve and a small-diameter portion adjacent to the bottom wall thereof.

According to one arrangement of the above form of the invention, the bushing further comprises a mounting rubber sleeve formed on the small-diameter portion of the stepped cylindrical wall of the outer sleeve. In this instance, the outer sleeve is secured to the support structure via the mounting rubber sleeve.

According to another arrangement of the same form of the invention, the outer sleeve includes an outward flange which extends radially outwardly from the open end of the outer sleeve and engages the support structure. In this case, the outward flange may consist of a semi-cylindrical flange formed over a substantially half of the circumference of the outer sleeve, and the bushing may further comprise the mounting rubber sleeve as indicated above. In this case, the mounting rubber sleeve may include a semi-cylindrical flange portion at one of opposite axial ends thereof which is adjacent to the closed end of the outer sleeve. The semi-cylindrical flange portion is formed so as to face the semi-cylindrical flange of the outer sleeve. In the present arrangement, the outer sleeve is secured to the support structure such that a part of the support structure is positioned between the semi-cylindrical flange portion of the mounting rubber sleeve and the semi-cylindrical flange of the outer sleeve. It is desirable that the surface of the semi-cylindrical flange of the outer sleeve which faces the semi-cylindrical flange portion of the mounting rubber sleeve is covered by a rubber layer, so that the support structure is held in pressed contact with the rubber layer and the semi-cylindrical flange portion of the mounting rubber sleeve.

In a yet further form of the present invention, the annular first restricted portion of the fluid chamber has a clearance of 1–6 mm as measured between the first elastic operating member and the opposite outer or inner circumferential surface of the inner or outer sleeves. Similarly, the planar second restricted portion of the fluid chamber has a clearance of 1–6 mm as measured between the second elastic operating member and the opposite bottom wall of the inner o outer sleeve.

To practice the principle of the invention, it is generally desirable that the fluid chamber be filled with the fluid whose kinematic viscosity is at least 1000 centistokes, preferably at least 10,000 centistokes, and most preferably within a range of 100,000 and 1,000,000 centistrokes.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which.

Figure 1:
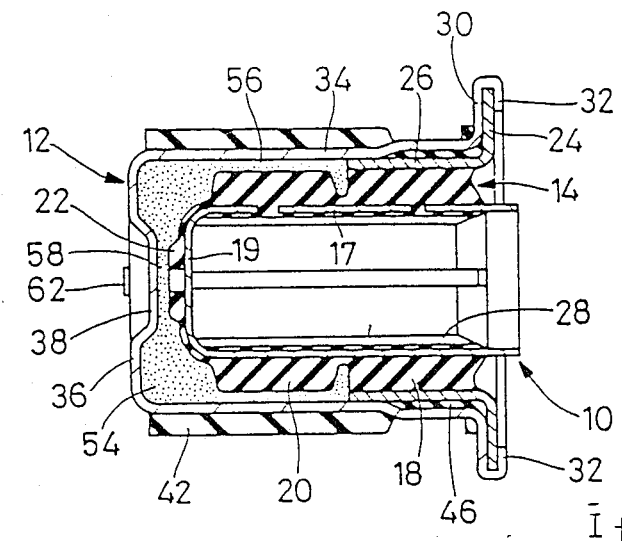
FIG. 1 is an elevational view in axial cross section of one embodiment of a fluid-filled elastic bushing of this invention, taken along line I—I of FIG. 2.
Figure 6:
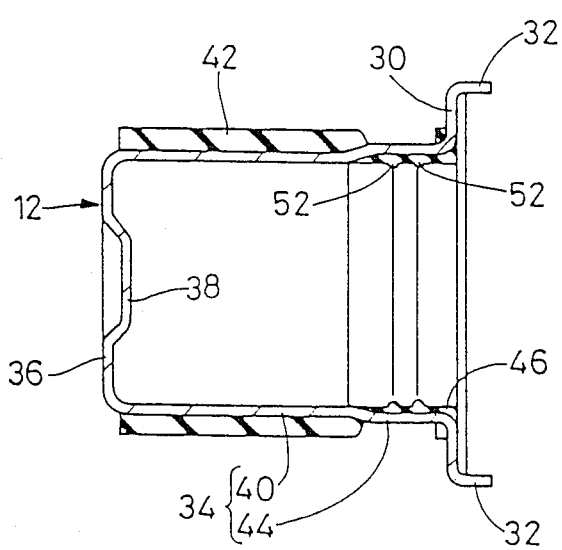
Figure 7:
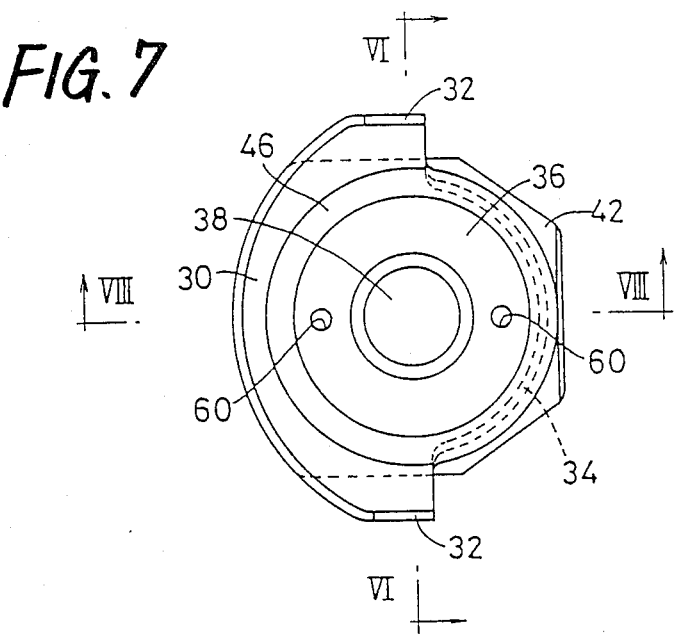
Figure 8:
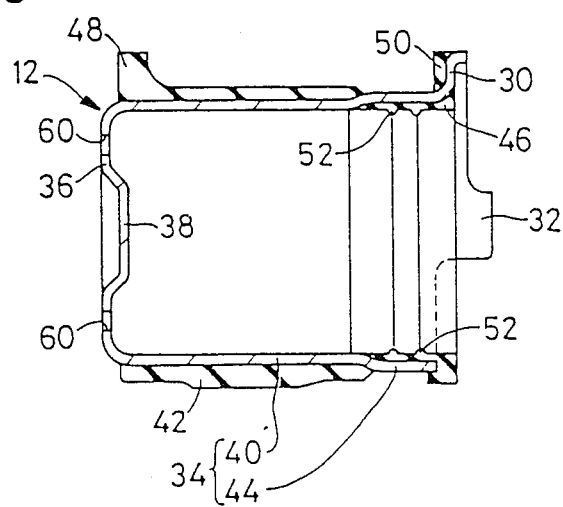

Fi. 6 is an elevational view in axial cross section of a outer sleeve unit of the elastic bushing of FIG. 1, taken along line VI—VI of FIG. 7;

FIG. 7 is a right-hand side end elevational view of the outer sleeve unit of FIG. 6; and FIG. 8 is a cross sectional view taken along line VIII—VIII of FIG. 7.

DETAILED DESCRIPTION OF THE PREFERRED EMBODIMENT

Figure 2:
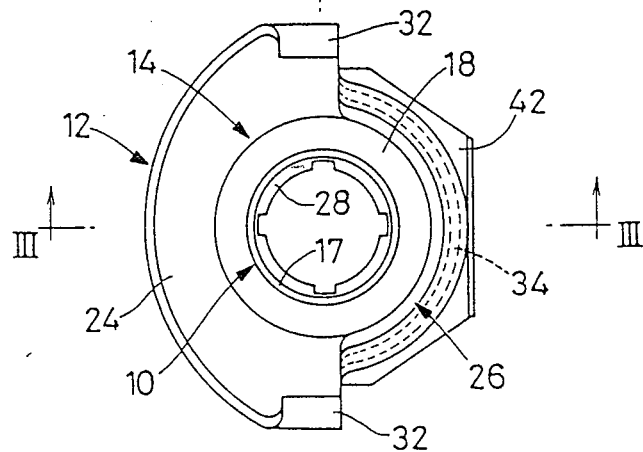
FIG. 2 is a right-hand side end elevational view of the elastic bushing of FIG. 1.
Figure 3:
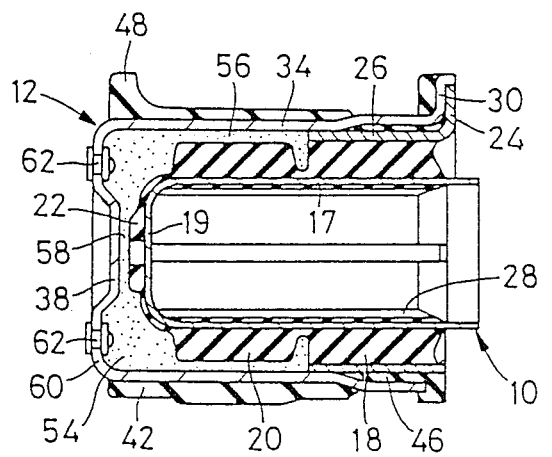
FIG. 3 is a cross sectional view taken along line III—III of FIG. 2.

Referring first to FIGS. 1–3, there is shown the presently preferred form of the fluid-filled elastic bushing in the form of an elastic bushing adapted for elastic or flexible connection of a compression rod of an L-type lower arm of the front suspension system of a motor vehicle to a frame of the vehicle.

As indicated in these figures, the elastic bushing includes a tubular metallic inner sleeve 10 which is closed at one of its axial ends and open at the other end, and a tubular metallic outer sleeve 12 which surrounds the inner sleeve 10 such that an annular space is formed between the outer circumferential surface of the inner sleeve 10 and the inner circumferential surface of the outer sleeve 12. These inner and outer sleeves 10, 12 are elastically secured to each other by a generally tubular elastic body 14 such that a cylindrical space communicating with the above-indicated annular is left between the closed end portion of the outer sleeve 12 and the corresponding end portion of the elastic body 14.

The elastic bushing is installed on the vehicle such that an end portion of the compression rod of the L-type lower arm is fixedly inserted into the axial bore of the inner sleeve 10, while the outer sleeve 12 is secured to the vehicle frame by using a U-shaped mounting bracket.

Figure 4:
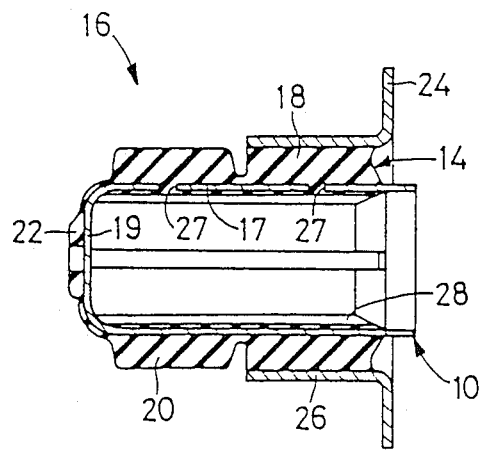
FIG. 4 is an elevational view in axial cross section of an intermediate product prepared in a vulcanization process, for manufacturing the instant elastic bushing, the cross sectional view being taken along line IV—IV of FIG. 5.
Figure 5:
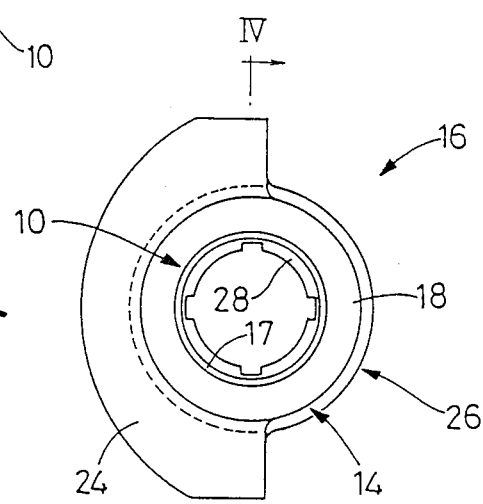
FIG. 5 is a right-hand side end elevational view of the intermediate product of FIG. 4.

In the process of manufacturing the instant elastic bushing, there is prepared an intermediate product as shown in FIGS. 4 and 5, such that the elastic body 14 is secured to the inner sleeve 10 by vulcanization in a suitable mold.

The elastic body 14 is an integrally formed rubber mass which includes a cylindrical elastic connecting member 18, a cylindrical first elastic operating member 20 integrally connected to the elastic connecting member 18, and a disc-like second elastic operating member 22 formed integrally with the first elastic operating member 20. The cylindrical elastic connecting member 18 is formed on a portion of the outer circumferential surface of a cylindrical wall 17 of the inner sleeve 10, which is adjacent to its open end. The cylindrical first elastic operating member 20 is formed on the rest of the outer circumferential surface of the cylindrical wall 17, which is adjacent to a bottom wall 19 of the inner sleeve 10. The disc-like second elastic operating member 22 is formed on the outer surface of the bottom wall 19 of the inner sleeve 10.

On the outer circumferential surface of the cylindrical elastic connecting member 18 of the elastic body 14, there is secured a metal sleeve 26 such that the inner sleeve 10 and the metal sleeve 26 are coaxial with each other. This metal sleeve 26 has a semi-annular outward flange 24 which extends radially outwardly from one of its opposite axial ends that is adjacent to the open end of the inner sleeve 10. The outward flange 24 corresponds to a substantially half of the circumference of the inner sleeve 10, and is aligned with the open end of the inner sleeve 10.

To prepare the intermediate product 16, the inner sleeve 10 and the metal sleeve 26 are positioned in place in the mold, and an unvulcanized rubber material is introduced into the mold, so as to form the elastic body 14 by vulcanization of the unvulcanized rubber material as well known in the art. In the present embodiment, the cylindrical wall 17 of the inner sleeve 10 has a plurality of holes, which permit the unvulcanized rubber material to flow from the outside into the inside of the wall 17, so that the inner circumferential surface of the wall 17 is coated with a thin inner rubber layer 28.

The thus prepared intermediate product 16 is preloaded with a suitable amount of radially inward compressive force, which is given, for example, by using eight drawing dies disposed around the metal sleeve 26.

The outer sleeve 12, which is prepared separately from the intermediate product 16, has a semi-cylindrical outward flange 30 which extends radially outwardly from its open end, as illustrated in FIGS. 6-8. The outward flange 30 corresponds to a substantially half of the circumference of the sleeve 12, and is provided at its circumferential ends with a pair of caulking portions 32.

The outer sleeve 12 has a stepped cylindrical wall 34 which consists of a small-diameter portion 40 on the side of its closed end, and a large-diameter portion 44 on the side of its open end. The large-diameter portion 44 has a suitable axial dimension considerably smaller than that of the small-diameter portion 40.

On the outer surface of the small-diameter portion 40 of the stepped cylindrical wall 34, there is formed a mounting rubber sleeve 42 by vulcanization. As indicated in FIG. 7, one of two halves of the circumference of the rubber sleeve 42 which corresponds to the half of the circumference of the outer sleeve 12 that is not provided with the semi-cylindrical outward flange 30 has a generally trapezoidal outer profile which fits a positioning recess formed in the vehicle frame. On the other hand, the other half of the circumference of the rubber sleeve 42 has an arcuate outer profile and has a flange portion 48 formed at the axial end adjacent to the bottom wall 36 of the outer sleeve 12. As indicated in FIG. 8, the flange portion 48 faces the outward flange 30 of the outer sleeve 12, in the axial direction of the sleeve 12. For installation of the instant elastic bushing, the above-indicated U-shaped mounting bracket secured to the vehicle frame is fitted on the mounting rubber sleeve 42, as described later. The axially inner surface of the outward flange 30 which faces the flange portion 48 is covered by a rubber layer 50 having a suitable thickness, so that the appropriate end of the mounting bracket is held in abutting contact with the rubber layer 50.

The inner surface of the large-diameter portion 44 of the stepped cylindrical wall 34 of the outer sleeve 12 is covered by a sealing rubber sleeve 46 formed by vulcanization. This rubber sleeve 46 has two circumferential sealing lips 52, 52 formed on its inner surface.

The instant elastic bushing is obtained by forcing the intermediate product of FIG. 4 into the thus constructed outer sleeve 12, through the open end of the sleeve 12, bending the caulking portions 32 of the sleeve 12 against the outward flange 24 of the intermediate product 16, and subjecting the large-diameter portion 44 of the outer sleeve 12 to a preliminary radially inward compressing operation using for example eight drawing dies disposed around the large-diameter portion 44.

With the intermediate product 16 forced into the interior of the outer sleeve 12, the inner sleeve 10 is disposed coaxially with the outer sleeve 12, such that the two sleeves 10, 12 are radially spaced apart from each other by a predetermined distance by the elastic body 14 which fluid tightly fills a portion of the annular space between the two sleeves 10, 12 that is adjacent to their open ends, as shown in FIGS. 1-3. Described more specifically, the inner and outer sleeves 10, 12 and the elastic body 14 cooperate to define a fluid chamber 54. This fluid chamber is sealed at the open end portion of the inner or outer sleeve 10, 12, by the cylindrical elastic connecting member 18 of the elastic member 14 integrally secured to the inner sleeve 10. More precisely, the fluid tightness of the fluid chamber 54 is maintained by a pressed contact between the outer surface of the metal sleeve 26 intergrally secured to the elastic connecting member 18 and the sealing rubber sleeve 46 integrally secured to the outer sleeve 12.

In the thus constructed elastic bushing, the wall thickness of the cylindrical first elastic operating member 20 of the elastic body 14 is determined such that its outer circumferential surface is spaced from the inner circumferential surface of the outer sleeve 12 by a suitable distance so that the fluid chamber 54 includes a first restricted portion in the form of an annular space 56 defined between the first elastic operating member 20 and the outer sleeve 12, as illustrated in FIGS. 1 and 3. In other words, the first elastic operating member 20 occupies a part of the annular space left between the inner and outer sleeves 10, 12 and thereby cooperate with the outer sleeve 12 to define therebetween the annular space 56 of the fluid chamber 54.

Similarly, the thickness of the disc-like second elastic operating member 22 of the elastic body 14 is determined such that its outer circular flat surface is spaced from the inner surface of a circular raised portion 38 of the bottom wall 36 of the outer sleeve 12 by a suitable distance so that the fluid chamber 54 includes a second restricted portion in the form of a relatively thin planar or flat space 58 which is defined between the second elastic operating member 20 and the raised portion 38, so as to extend in the radial direction of the bushing. Namely, the second elastic operating member 22 occupies a part of the cylindrical space left between the bottom walls 19, 36 of the inner and outer sleeves 10, 12, and thereby cooperates with the raised portion 38 of the bottom wall 36 of the outer sleeve 12 to define therebetween the planar space 58.

The first and second elastic operating members 20, 22 of the elastic body 14 which cooperate with the closed end portion of the outer sleeve 12 to define the annular and thin flat spaces 56, 58 are formed substantially mechanically independently of the elastic connecting member 18, so as to minimize elastic deformation of the elastic operating members 20, 22 upon elastic deformation of the elastic connecting member 18 due to a relative radial displacement of the inner and outer sleeves 10, 12.

The fluid chamber 54 which includes the first and second restricted portions in the form of the annular space 56 and the thin flat space 58 is filled with a suitable viscous fluid. In the instant elastic bushing, the bottom wall 36 of the outer sleeve 12 has two fluid injecting holes 60, 60 as shown in FIGS. 7 and 8. These holes 60 are used to fill the viscous fluid into the fluid chamber 54 after the intermediate product 16 is fluid tightly fitted in the outer sleeve 12 as described above. For instance, the fluid is injected into the fluid chamber 54 through one of the two holes 60, 60 while the other hole 60 is used as an air breather through which the atmosphere in the chamber 54 is discharged as the fluid is introduced into the chamber 54. With the fluid chamber 54 filled with the fluid, the holes 60 are fluid tightly closed by suitable closure means such as rivet plugs 62, 62 as shown in FIG. 3. Thus, the fluid-filled elastic bushing as shown in FIGS. 1–3 is manufactured.

As previously stated, the instant elastic bushing is installed on the vehicle such that the compression rod of the L-type lower arm of the front suspension system is fixedly inserted into the bore of the inner sleeve 10, while the outer sleeve 12 is secured to the vehicle frame via the U-shaped bracket. In this manner, the compression rod is flexibly or elastically connected to the vehicle frame.

When a relative radial displacement of the inner and outer sleeves 10, 12 occurs due to a vibrational load applied to the thus constructed fluid-filled elastic bushing in the radial direction, the first elastic operating member 20 formed on the cylindrical wall 17 of the inner sleeve 10 is oscillated radially in the fluid chamber 54 relative to the inner circumferential surface of the cylindrical wall 34 of the outer sleeve 12. At the same time, the second elastic operating member 22 formed on the bottom wall 19 of the inner sleeve 10 is oscillated relative to the inner surface of the circular raised portion 38 of the bottom wall 36 of the outer sleeve 12 in the radial direction of the bushing. As a result, the masses of the viscous fluid existing in the first and second restricted portions (annular space 56 and thin flat space 58) of the fluid chamber 54 are subject to shearing stresses. In other words, the viscosity of the fluid masses in these restricted portions 56, 58 provides resistances to the shearing stresses due to the radial movements of the first and second elastic operating members 20, 22.

When a relative axial displacement of the inner and outer sleeves 10, 12 occurs due to a vibrational load applied to the instant elastic bushing in the axial direction, the first elastic operating member 20 formed on the cylindrical wall 17 is oscillated in the fluid chamber 54 in the axial direction of the inner sleeve 10 relative to the cylindrical wall 34 of the outer sleeve 12. Simultaneously, the second elastic operating member 22 formed on the bottom wall 19 of the inner sleeve 10 is oscillated toward and away from the raised portion 38 of the bottom wall 36 of the outer sleeve 12. Consequently, the masses of the viscous fluid existing in the first and second restricted portions 56, 58 of the fluid chamber 54 are subject to shearing stresses. In this case, too, the viscosity of the fluid masses in these restricted portions 56, 58 provides resistances to the shearing stresses due to the axial movements of the first and second elastic operating members 20, 22.

A value (F) of the resistance to the shearing stresses due to the viscosity of the fluid masses is expressed by the following equation:

$$F = (\mu A/h)v$$

where, $\mu$: coefficient of viscosity of the fluid h: clearance between the first (second) elastic operating member 20 (22) and the outer sleeve 12, at the annular space 56 (flat space 58)

v: velocity of the vibrational load

It follows from the above equation that the resistance force (F) produced by the viscous fluid depends upon the velocity of the input vibration, and is substantially free from an influence of the frequency of the vibration.

That is, the instant fluid-filled elastic bushing exhibits a excellent damping characteristic owing to the effective resistance force produced by the fluid masses due to its viscosity, with respect to the input vibrations in a relatively wide frequency range, which includes the vibrations in a comparatively low frequency band that cannot be dealt with in an effective manner by elastic properties of a single formed rubber mass used in the conventional elastic bushing. Accordingly, the instant fluid-filled elastic bushing is capable of preventing shimmy vibrations of the vehicle, and effectively enhancing the steering and running stability of the vehicle.

It will be understood from the above description that the kinematic viscosity of the fluid filling the fluid chamber 54, and the clearances "h" of the annular and flat spaces 56, 58 may be determined so as to provide the elastic bushing with desired damping characteristic. For instance, it is possible to use a silicone oil or other fluid which has a kinematic viscosity of at least 1000 centistokes, preferably at least 10,000 centistokes, and more preferably within a range of 100,000–1,000,000 centistokes. The clearances "h" at the first and second restricted portions 56, 58 of the chamber 54 should generally be held within a range of 1–6 mm.

In the thus constructed fluid-filled elastic bushing, the first and second elastic operating members 20, 22 which partially define the first and second restricted portions (annular and flat spaces) 56, 58 also function as elastically yieldable members which may abut on the inner surfaces of the outer sleeve 12, thereby preventing excessive amounts of relative radial and axial displacements of the inner and outer sleeves upon application of an excessive vibrational load to the bushing.

A further advantage of the present fluid-filled elastic bushing is offered by the provision of the fluid injecting holes 60, 60 formed in the bottom wall 36 of the outer sleeve 12. Namely, the holes 60, 60 facilitate the filling of the viscous fluid chamber 54 with the selected fluid, after the intermediate product 16 is forced into the outer sleeve 12. This manner of filling the fluid chamber 54 eliminates undesirable exposure of the outer surface of the elastic bushing to the fluid, which would be encountered if the fluid chamber 54 was filled with the fluid by assembling the intermediate product 16 and the outer sleeve 12, within a mass of the fluid. Accordingly, the manufacturing process of the instant bushing is comparatively simplified.

While the presently preferred embodiment of the fluid-filled elastic bushing of the present invention has been described, for illustrative purpose only, it is to be understood that the invention is not limited to the details of the illustrated embodiment.

In the illustrated embodiment, the cylindrical first elastic operating member 20 and the disc-like second elastic operating member 22 ar formed as integral parts of the cylindrical elastic connecting portion 18 of the elastic body 14. However, the elastic operating members 20, 22 may be formed separately from the elastic connecting member 18. In this case, the members 20, 22 may be given elastic properties different from that of the connecting member 18.

Further, the first and second elastic operating members 20, 22 may be replaced by respective elastic members which are formed on the inner surfaces of the outer sleeve 12 such that these members cooperate with the inner sleeve 10 to define first and second restricted portions of the fluid chamber 54.

While the illustrated elastic bushing has the fluid injecting holes 60, 60 formed through the bottom wall 36 of the outer sleeve 12 for filling the fluid chamber 54 with the viscous fluid, the filling of the fluid chamber 54 may be accomplished by assembling the inner and outer sleeves 10, 12 within a mass of the fluid.

Further, the inner rubber layer 28 formed on the inner circumferential surface of the inner sleeve 10 and the mounting rubber sleeve 42 formed on the outer circumferential surface of the outer sleeve 12 are not essential to practice the principle of the present invention, and the configurations of these rubber layer and sleeve 28, 42 may be modified as needed, depending upon the specific configurations of the appropriate compression rod and mounting bracket.

Although the illustrated fluid-filled elastic bushing is adapted for elastic connection of the compression rod of the L-type lower arm of the front suspension system of a vehicle to the vehicle frame, the elastic bushing of the present invention may be equally suitably used as a bushing interposed between any two members of a vibration system. In this case, necessary changes and modifications may obviously be made in the construction of the bushing.

It will be understood that the present invention may be embodied with various other changes, modifications and improvements which may occur to those skilled in the art, without departing from the spirit and scope of the invention defined in the following claims.

What is claimed is:

1. An elastic bushing filled with a viscous fluid, for flexible connection of a shaft member to support structure, comprising:
    a tubular inner sleeve which is closed at one of opposite axial ends thereof and open at the other end, said shaft member being fixedly inserted in said inner sleeve;
    a tubular outer sleeve which is closed at one of opposite axial ends thereof and open at the other end, which is disposed radially outwardly of said inner sleeve such that an annular space is formed between an outer circumferential surface of said inner sleeve and an inner circumferential surface of said outer sleeve and such that a cylindrical space is formed between opposed surfaces of bottom walls at the closed ends of said inner and outer sleeves, said outer sleeve being secured to said support structure;
    a cylindrical elastic connecting member which fluid tightly fills a portion of said annular space adjacent to the open ends of said inner and outer sleeves, and thereby cooperates with said inner and outer sleeves to define a fluid chamber which includes a remaining portion of said annular space and said cylindrical space, said fluid chamber being filled with said fluid;
    a first elastic operating member formed on one of said outer and inner circumferential surfaces of said inner and outer sleeves, so as to occupy a part of said remaining portion of said annular space and cooperate with the other of said outer and inner circumferential surfaces to define therebetween an annular first restricted portion of said fluid chamber; and
    a second elastic operating member formed on one of said opposed surfaces of said bottom walls of said inner and outer sleeves, so as to occupy a part of said cylindrical space and cooperate with the other of said opposed surfaces to define therebetween a planar second restricted portion of said fluid chamber which extends in a radial direction of the bushing.

2. An elastic bushing according to claim 1, wherein said cylindrical elastic connecting member and said first and second elastic operating members constitute an integrally formed elastic body which is secured by vulcanization to said inner sleeve.

3. An elastic bushing according to claim 1, wherein said second elastic operating member is formed on the outer surface of the bottom wall of said inner sleeve.

4. An elastic bushing according to claim 1, wherein said planar second restricted portion of said fluid chamber has a clearance of 1-6 mm between said second elastic operating member and said one of the opposed surfaces of said bottom walls of said inner and outer sleeves.

5. An elastic bushing filled with a viscous fluid, for flexible connection of a shaft member to a support structure, comprising:
    a tubular inner sleeve which is closed at one of opposite axial ends thereof and open at the other end, said shaft member being fixedly inserted in said inner sleeve;
    a tubular outer sleeve which is closed at one of opposite axial ends thereof and open at the other end, which is disposed radially outwardly of said inner sleeve such that an annular space is formed between an outer circumferential surface of said inner sleeve and an inner circumferential surface of said outer sleeve and such that a cylindrical space is formed between opposed surfaces of bottom walls at the closed ends of said inner and outer sleeve, said outer sleeve being secured to said support structure;
    a cylindrical elastic connecting member which fluid tightly fills a portion of said annular space adjacent to the open ends of said inner and outer sleeves, and thereby cooperates with said inner and outer sleeves to define a fluid chamber which includes a remaining portion of said annular space and said cylindrical space, said fluid chamber being filled with said fluid;
    a first elastic operating member formed on one of said outer and inner circumferential surfaces of said inner and outer sleeves, so as to occupy a part of said remaining portion of said annular space and cooperate with the other of said outer and inner circumferential surfaces to define therebetween an annular first restricted portion of said fluid chamber;

said outer sleeve having a stepped cylindrical wall which has said inner circumferential surface that partially defines said annular space, said stepped cylindrical wall including a large-diameter portion adjacent to said open end of the outer sleeve and a small-diameter portion adjacent to said bottom wall thereof;

said outer sleeve including an outward flange which extends radially outwardly from said open end of the outer sleeve, said outward flange engaging said support structure;

said outward flange comprising a semi-cylindrical flange formed over substantially half of the circumference of said outer sleeve;

further comprising a mounting rubber sleeve formed on said small-diameter portion of said stepped cylindrical wall of said outer sleeve, said mounting rubber sleeve including a semi-cylindrical flange portion at one of opposite axial ends thereof which is adjacent to said closed end of said outer sleeve, said semi-cylindrical flange portion facing said semi-cylindrical flange of said outer sleeve, said outer sleeve being secured to said support structure such that a part of said support structure is positioned between said semi-cylindrical flange portion of said mounting rubber sleeve and said semi-cylindrical flange of said outer sleeve.

6. An elastic bushing according to claim 5, further comprising a rubber layer which covers a surface of said semi-cylindrical flange of said outer sleeve which faces said semi-cylindrical flange portion of said mounting rubber sleeve, said support structure being held in pressed contact with said rubber layer and said semi-cylindrical flange portion of said mounting rubber sleeve.

* * * * *